Dec. 27, 1927.  A. DININ  1,653,949
PORTABLE BATTERY OF ELECTRIC ACCUMULATORS
Filed April 25, 1922  3 Sheets-Sheet 1
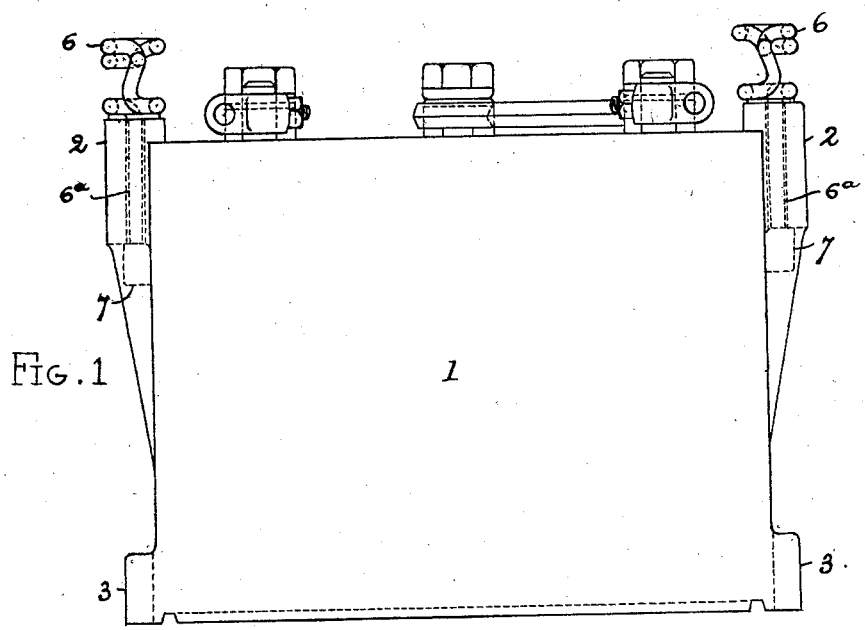
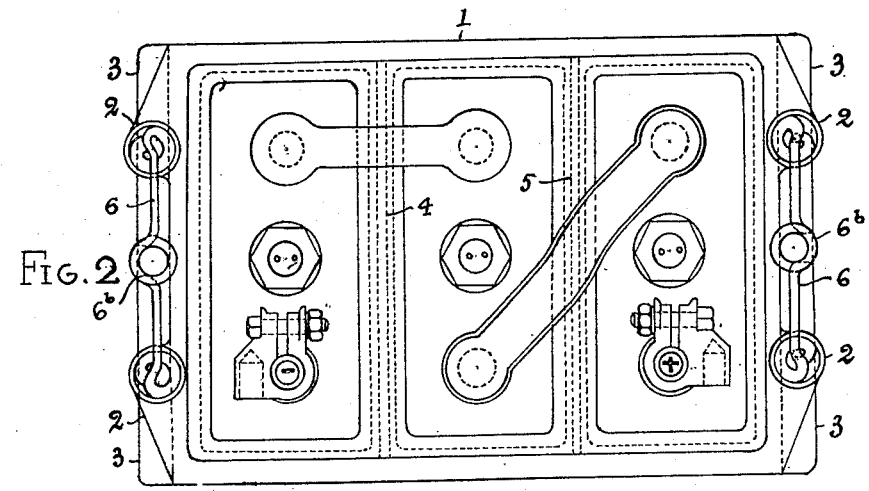

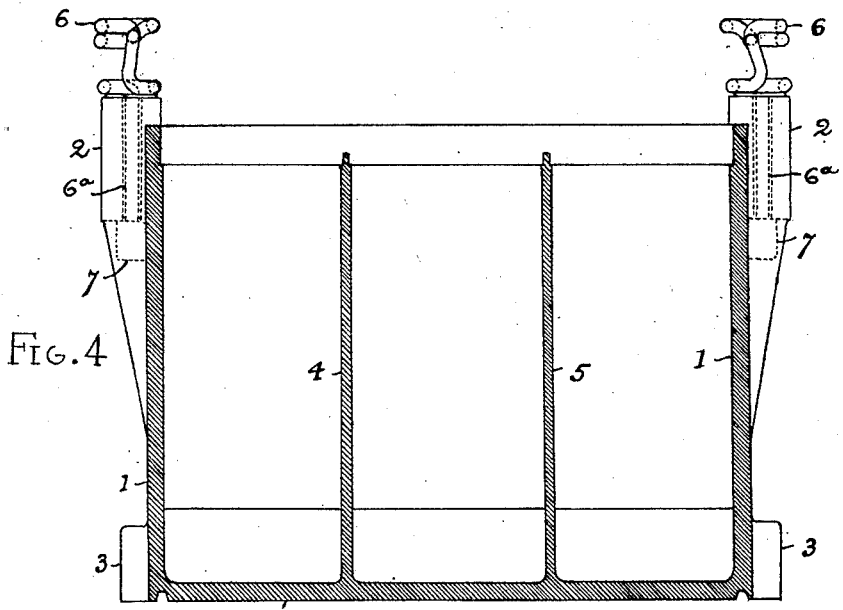
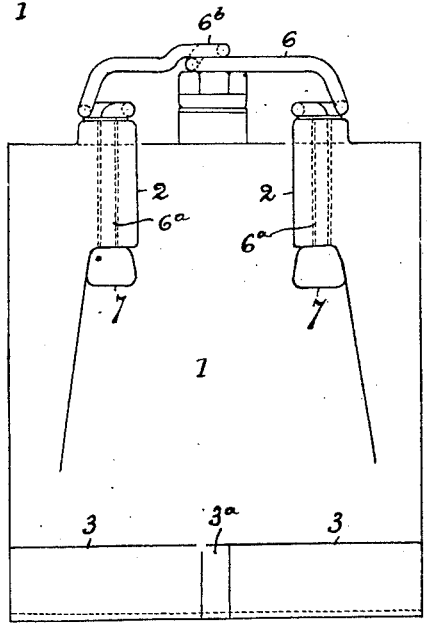

Dec. 27, 1927.  A. DININ  1,653,949

PORTABLE BATTERY OF ELECTRIC ACCUMULATORS

Filed April 25, 1922.   3 Sheets-Sheet 3

Inventor:
Alfred Dinin

Patented Dec. 27, 1927.

1,653,949

UNITED STATES PATENT OFFICE.

ALFRED DININ, OF NANTERRE, FRANCE.

PORTABLE BATTERY OF ELECTRIC ACCUMULATORS.

Application filed April 25, 1922, Serial No. 556,387, and in France July 6, 1921.

My invention relates to portable electric batteries; it consists essentially in a jar having several compartments serving as containers for the electrodes, the jar constituting at the same time the outer casing which encloses the electrodes to protect them and to facilitate handling of same. Moreover, this multiple-compartment jar is provided with devices enabling the adaptation thereto of handles, which at the same time form a means for fixing the jar in position.

The jar, being either itself of insulating material and proof against the electrolyte or being provided with a suitable lining, does away with the drawbacks resulting from the corrosive action of the acid on the boxes of wood or metal usually employed for batteries. Moreover, by the use of my jar the operation of assembling and fixing the electrodes in position is considerably simplified.

The jar is advantageously obtained either by moulding or other similar process.

The accompanying drawing shows by way of example one of the embodiments of my invention.

Fig. 1 is a view in elevation of a battery mounted in its three-compartment jar moulded in a single piece.

Fig. 2 is a plan view, and

Fig. 3 is an end view thereof.

Fig. 4 is a longitudinal section through the jar.

The three-compartment jar 1, of suitable material, moulded in one piece, has at each end two symmetrical bosses 2 formed near the top and a projecting portion 3 provided near the bottom and extending the whole width. Two partitions 4 and 5 divide the jar into three compartments adapted to receive the electrodes.

All these parts are moulded in one piece and constitute a three-compartment "monobloc" jar.

Figure 5:
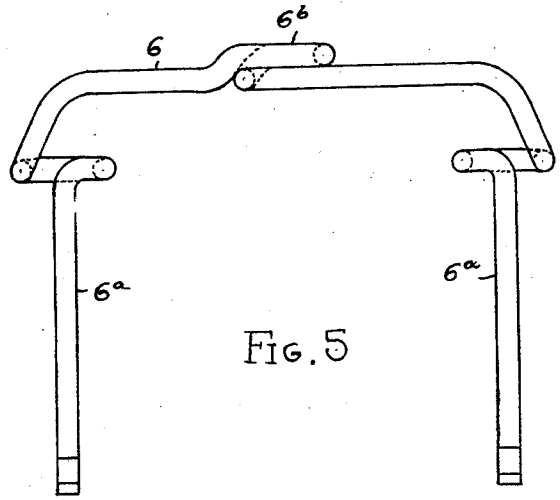
Fig. 5 is a detail view, on an enlarged scale, of a special handle.
Figure 6:
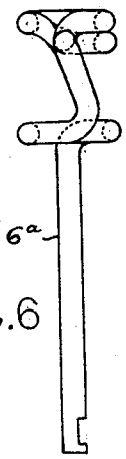
Fig. 6 is a side view and Fig. 7 a plan view of the said handle.
Figure 7:
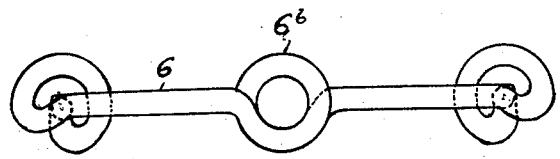
Figures 8, 9:
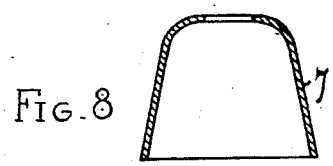
Figs. 8, 9 and 10 are detail views of a sealing lug for these handles.
Figure 10:
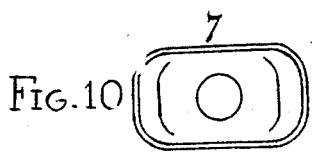

A box extends through the bosses 2 for the fixation of the handles 6, made of metal wire and bent into the shape shown in Figs. 5–7, giving them a certain amount of elasticity. The parts 6ª of these handles pass through the bores in the bosses 2 and have their lower ends lead-sealed in cups 7, Figs. 8–10, which bear against the lower faces of the bosses.

The handles 6 form at the centre a loop $6^b$, Figs. 2–7, for the passage therethrough of a bolt for fixing the jar in the box which is to contain same. In order to allow the passage of this bolt, the lower projecting portioned 3 has a recess $3^a$ in which the bolt is located without projecting. The head of the bolt being engaged in the box and a nut being screwed onto the bolt above the loop $6^b$ of the handles, the jar will be firmly retained in place and secured against any movement, both vertically and laterally.

Jars comprising any number of compartments may of course be made in the same manner. Their shape may vary as well as the material of which they are made. They can be provided of course with any suitable type of handles.

I claim as my invention:

1. In a portable electric storage battery, a jar constituting the cell container, projecting portions on the sides of said jar and at the lower portion thereof having openings therein, bosses on the sides of said jar having bores therethrough, and wire handles having shank portions passing through and adapted to be secured within said bores, said wire handles having loops in their center portions adapted to coact with said openings to permit positioning of securing devices in said loops and openings.

2. A detachable wire handle for a portable electric storage battery comprising shank portions adapted to pass through bores in said battery and to be secured at the ends thereof, and a central loop portion for attachment of a hold-down element.

ALFRED DININ.